(12) United States Patent
Chong et al.

(10) Patent No.: US 11,989,180 B2
(45) Date of Patent: May 21, 2024

(54) PROACTIVE QUERY PLAN COMPILATION

(71) Applicant: SAP SE, Walldorf (DE)

(72) Inventors: Jaehyok Chong, Seoul (KR); Won Jun Chang, Seoul (KR); Youngbin Bok, Seoul (KR)

(73) Assignee: SAP SE, Walldorf (DE)

( * ) Notice: Subject to any disclaimer, the term of this patent is extended or adjusted under 35 U.S.C. 154(b) by 39 days.

(21) Appl. No.: 17/967,623

(22) Filed: Oct. 17, 2022

(65) Prior Publication Data

US 2024/0126753 A1 Apr. 18, 2024

(51) Int. Cl.
*G06F 16/00* (2019.01)
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| | | | |
|---|---|---|---|
| 2012/0005189 A1* | 1/2012 | Yu | G06F 16/24542 707/718 |
| 2015/0379076 A1* | 12/2015 | Grosse | G06F 16/2448 707/718 |
| 2016/0350375 A1* | 12/2016 | Das | G06F 16/2456 |
| 2017/0337253 A1* | 11/2017 | An | G06F 16/27 |

* cited by examiner

*Primary Examiner* — Anhtai V Tran
(74) *Attorney, Agent, or Firm* — Fountainhead Law Group P.C.

(57) ABSTRACT

Computer-readable media, methods, and systems are disclosed for proactively compiling in-memory database management system (DBMS) query plans upon startup of the in-memory DBMS. During normal operation of the in-memory DBMS, alternative query plans having associated execution statistics are collected and captured. Thereafter, the alternative query plans are selectively persisted and in response to detecting performance regressions, the regressed query plan is compared with prior query plans. In response to determining that a prior query plan performs better, the regressed query plan is replaced with the prior query plan. Upon a restart of the in-memory DBMS, a selected portion of the plurality of alternative query execution plans is loaded, and the plurality of alternative query execution plans are compiled. New queries are received and executed based on the proactively compiled query plans.

20 Claims, 5 Drawing Sheets

PROACTIVE QUERY PLAN COMPILATION

TECHNICAL FIELD

Embodiments generally relate to proactive query plan compilation in database management systems (DBMS), and more particularly proactively compiling in-memory DBMS query plans upon startup processing in connection with the in-memory DBMS.

When an in-memory DBMS index server initially starts up, all incoming queries received immediately after a DBMS restart may need to be compiled again because the cached plans, which are stored in volatile memory, may have been lost when the DBMS was shut down. Thus, as new queries are received, corresponding query plans typically need to be sequentially recompiled. As a result, DBMS system performance (and the performance of any associated applications that rely on the DBMS for content) suddenly decreases. In addition, there is a chance of query plan regression by query plan changes that occur based on query plan compilation/optimization that occurs after the system restart. Accordingly, mechanisms are needed for obtaining query plans after a restart of an in-memory DBMS.

SUMMARY

Disclosed embodiments address the above-mentioned problems by providing one or more non-transitory computer-readable media storing computer-executable instructions that, when executed by a processor, perform a method for proactively compiling in-memory database management system (DBMS) query plans upon startup of the in-memory DBMS, the method comprising: during normal operation of the in-memory DBMS: capturing a plurality of alternative query execution plans, collecting associated execution statistics for each of the plurality of alternative query execution plans, selectively persisting the plurality of alternative query execution plans with the associated execution statistics to one or more persistent data stores, in response to detecting one or more query execution performance regressions associated with a regressed query plan: comparing the regressed query plan with one or more prior query plans, and in response to determining that a candidate prior query plan of the one or more prior query plans performs better than the regressed query plan, replacing the regressed query plan with the candidate prior query plan, and upon a restart of the in-memory DBMS: loading a selected portion of the plurality of alternative query execution plans with the associated execution statistics from the one or more persistent data stores, proactively compiling the selected portion of the plurality of alternative query execution plans, receiving a plurality of received queries to be executed, and executing the plurality of received queries based on the proactively compiled plurality of alternative query execution plans.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

In memory DBMS consistent with the present teachings employ query plan stability features that capture newly compiled complex queries. Using these captured plans, upon system restart certain query plans may be proactively compiled, asynchronously, so that they cache them after the server restarts and (ideally) before a corresponding query is received by the in-memory DBMS. Accordingly, after a system restart, query plans associated with queries in a particular query workload can be found in a SQL plan cache and performance degradation associated with expensive query compilation or execution plan changes can be mitigated.

Proactive query plan compilation in a DBMS assists in preventing the degradation of system performance over time due to a startup/shut down, restart, or other down time associated with maintenance. Before a down period, the DBMS will have incoming queries from before the shutdown that must be compiled again before any new queries can be assessed. This is caused by a lack of cached plans stored while the server is down. In a typical application of the DBMS, the queries recently submitted before the shutdown of the system must be recompiled. A recompilation of queries will have a significant declining impact on the overall performance of the system.

Operational Environment for Embodiments

Figure 1:
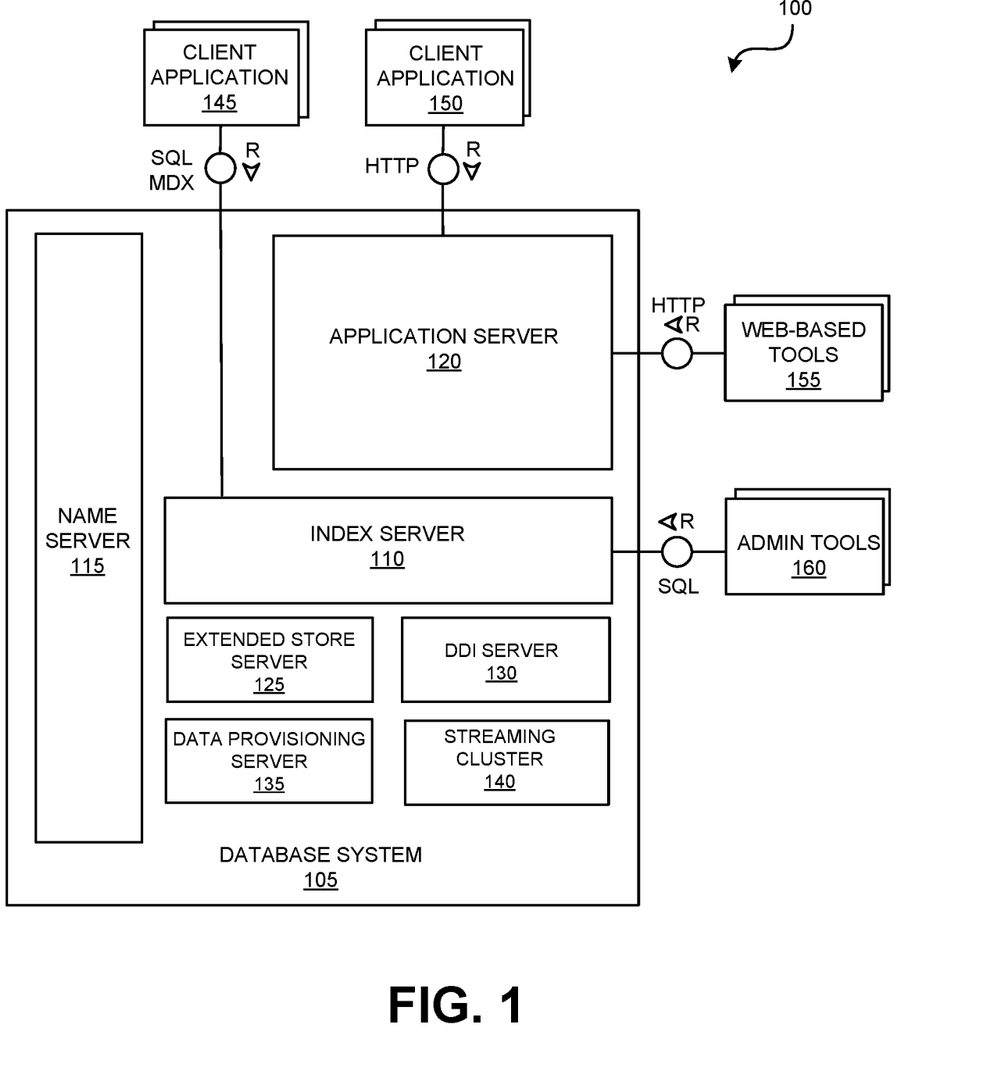
FIG. 1 is a system diagram 100 illustrating an example database system 105 for use in connection with the current subject matter.

FIG. 1 is a system diagram 100 illustrating an example database system 105 for use in connection with the current subject matter. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120. Index server 110 may contain in-memory data stores and engines for processing data. Index server 110 may also be accessed by remote tools (via, for example, SQL queries), that can provide various development environment and administration tools.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
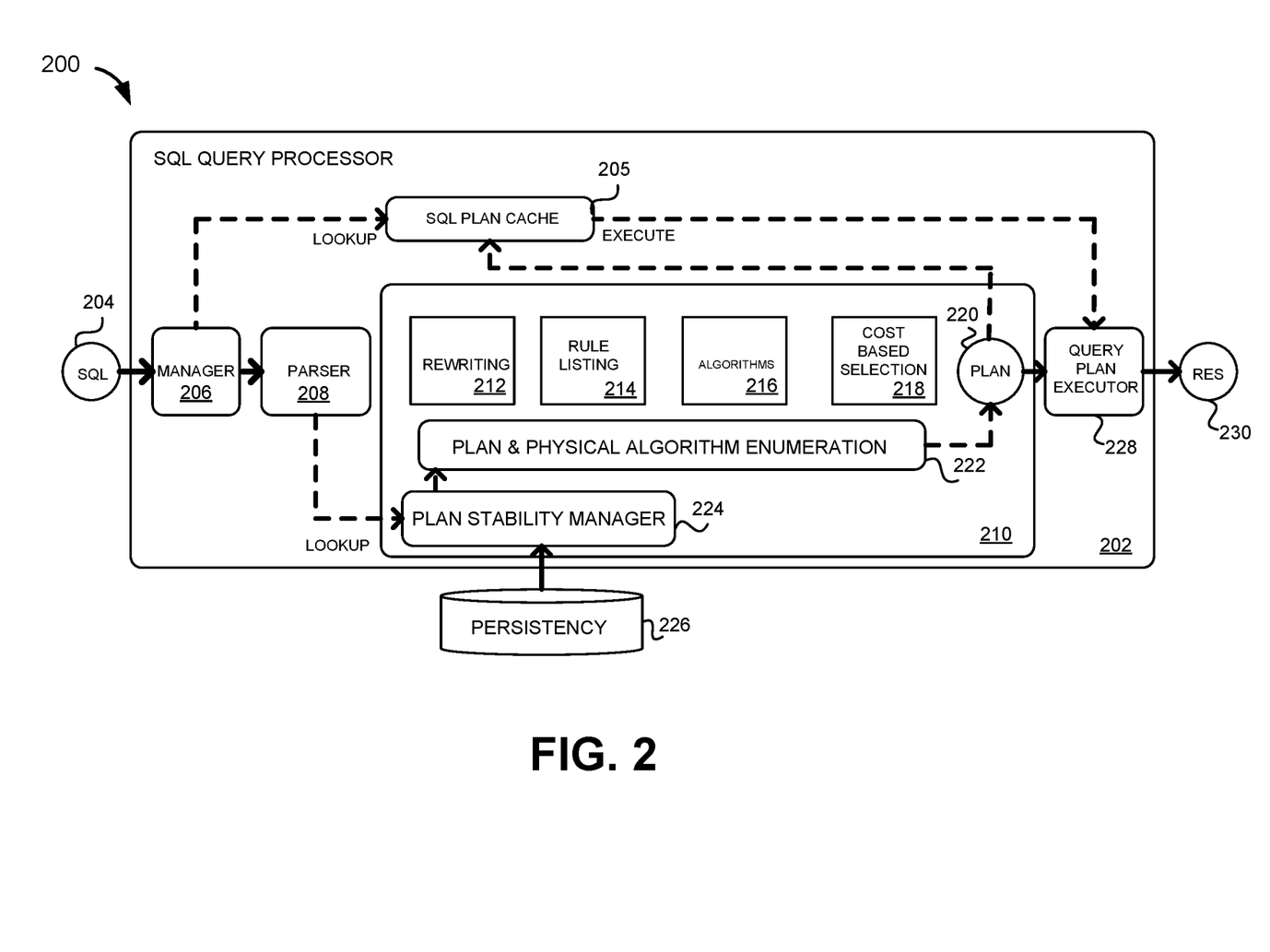
FIG. 2 is a diagram illustrating an example method for applying captured plans in query execution plan generation.

FIG. 2 is a diagram 200 illustrating an example method for applying captured plans in query execution plan generation. SQL query processor 200 receives a SQL statement 204 such as, for example, a SQL SELECT statement containing a complex join statement and/or an aggregation. SQL statement 204 is passed along to manager 206, which may perform a lookup in SQL plan cache 205. If a suitable query execution plan (query plan or simply "plan") is found in SQL plan cache 205, the cached query plan may be executed by query plan executor 226 and corresponding query results output at results output 230.

If manager 206 does not find a suitable query plan in SQL plan cache 205 or (in some embodiments) where manager 206 determines it appropriate to capture an alternative query execution plan, execution continues to parser 208, where SQL statement 204 may be parsed, checked, and otherwise preprocessed prior to being sent to SQL optimizer 210. Within SQL optimizer 210, SQL statement 204 may be first transmitted to plan stability manager 224, which itself may manage and/or coordinate activities within SQL optimizer 210.

Within SQL optimizer 210, possible query plans are generated and evaluated in connection with distributor 222, which performs a plan and physical algorithm enumeration, which is a guided physical algorithm enumeration that checks if the algorithm which was specified in the captured plan can be used for the execution plan generation in a current version of optimizer and, if possible, generates an alternative for that algorithm which will be used in the plan generation.

From here, if there is no matching captured plan in 226, portions of SQL statement 204 may undergo rule-based logical plan rewriting, for example at rewriting block 212. SQL statement 204 may also undergo one or more rule-based logical plan enumerations, for example, at rule listings block 214/SQL statement 204 may also undergo physical algorithm enumeration at algorithms block 214. Finally, a cost-based plan selection may be performed in connection with cost-based selection block 216. Distributor 222 may then direct the generation of a concrete query execution plan 220 and instruct plan 220 to be executed by query plan executor 228, thereby producing results output 230. In some embodiments, plan 220 is also cached in SQL plan cache 205 for future use. In some embodiments, associated execution statistics are also cached in SQL plan cache 205. However, SQL plans such as plan 220 may also be stored in persistency 226, which may be any kind of a persistent data store, such as a file persisted on physical storage or any other kind of persistent data storage.

Figure 3:
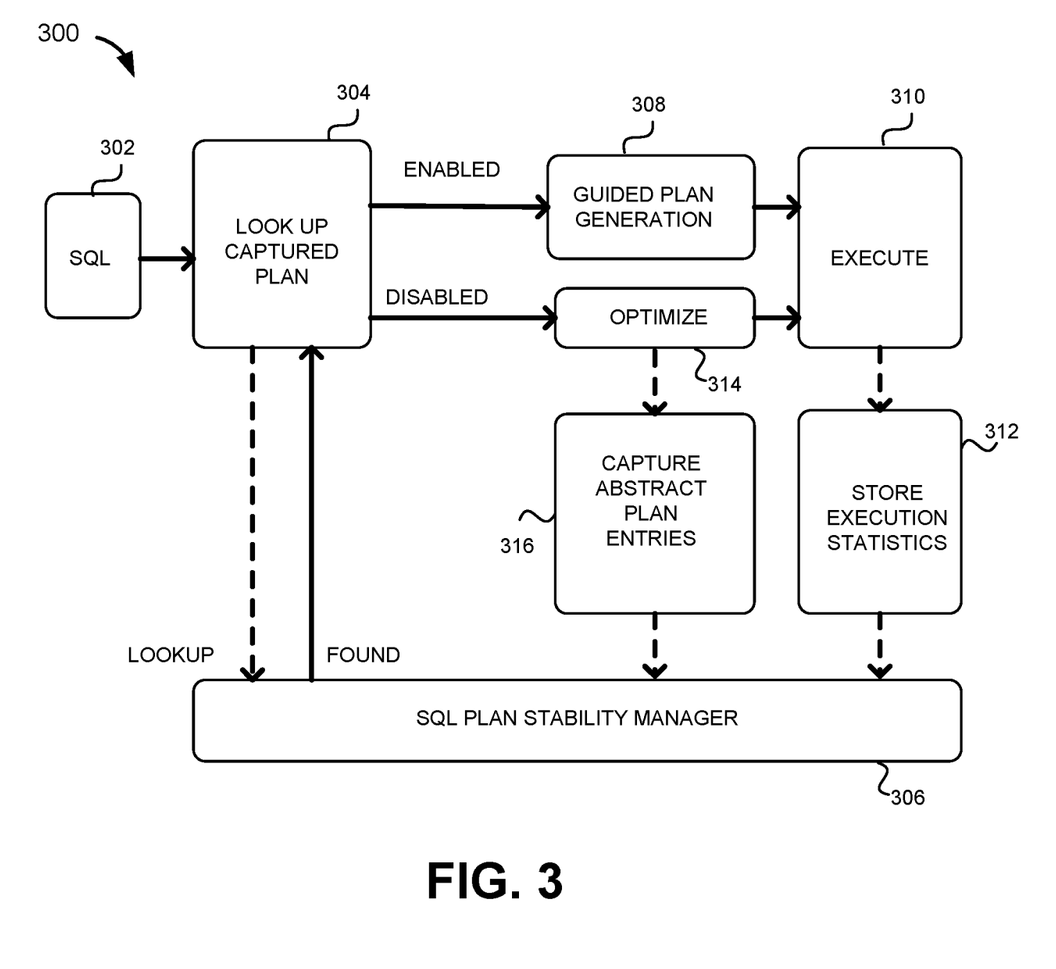
FIG. 3 is a diagram illustrating another example method for capturing alternative query execution plans and applying associated plans.

FIG. 3 is a diagram 300 illustrating another example method for capturing alternative query execution plans and collecting associated statistics. First, SQL statement 302 is provided to module 304, which may look up one or more captured plans that may correspond to a query as provided by SQL statement 302. Similar to SQL statement 204 above, SQL statement 302 may be an SQL statement such as, for example, a SQL SELECT statement containing a complex join statement and/or an aggregation.

In some embodiments, module 304 performs a lookup for SQL statement 304 in connection with module 306, which may be a SQL plan stability manager, which maintains a set of alternative query plans for a particular SQL query. If the looked-up query is found, one or more corresponding query plans are returned to module 304. If no such query plan is found in connection with module 306, a new query plan may be developed. In order to develop a new query plan, execution may follow along the disabled path to module 314 which seeks to find an optimal query plan. This path of execution may occur when use of existing query plans is disabled or when the lookup process does not find any existing query plans stored or cached in connection with module 306. Once a suitable query plan is identified at module 314, module 316 facilitates capture of abstract query plan entries. In some embodiments, only the selected query plan is sent from module 314 through module 316 to module 306. In some other embodiments a plurality of alternative query plans that were developed (and considered) in connection with module 314 may be transmitted and processed and/or stored in connection with module 306.

Returning back to module 304, if a captured plan is enabled and a corresponding plan found in connection with the lookup operation described above, module 308 may perform a guided plan generation. In some embodiments, the captured plan has a specific logical plan structure and each operation in the plan structure has its physical algorithm. Thus, for plan generation, it is not necessary to enumerate each alternative logical plan structure or all possible physical algorithms. The optimizer may use the captured plan structure (abstract plan) as its logical plan and use the specified physical algorithm. Such a process appears to be "guided" by the captured plan and thus may be called a "guided plan enumeration/generation." A corresponding query plan may then be delivered to module 310 for execution. Regardless how module 310 receives a query plan, module 310 may execute the received query plan and provide a SQL result. In addition to providing the result module 310 may also generate certain execution statistics such as a number of times the particular plan has been executed, a time of execution and/or costs (physical resources) consumed in carrying out the execution of the query plan. Such execution statistics may be cached and/or stored in connection with module 306.

Figure 4:
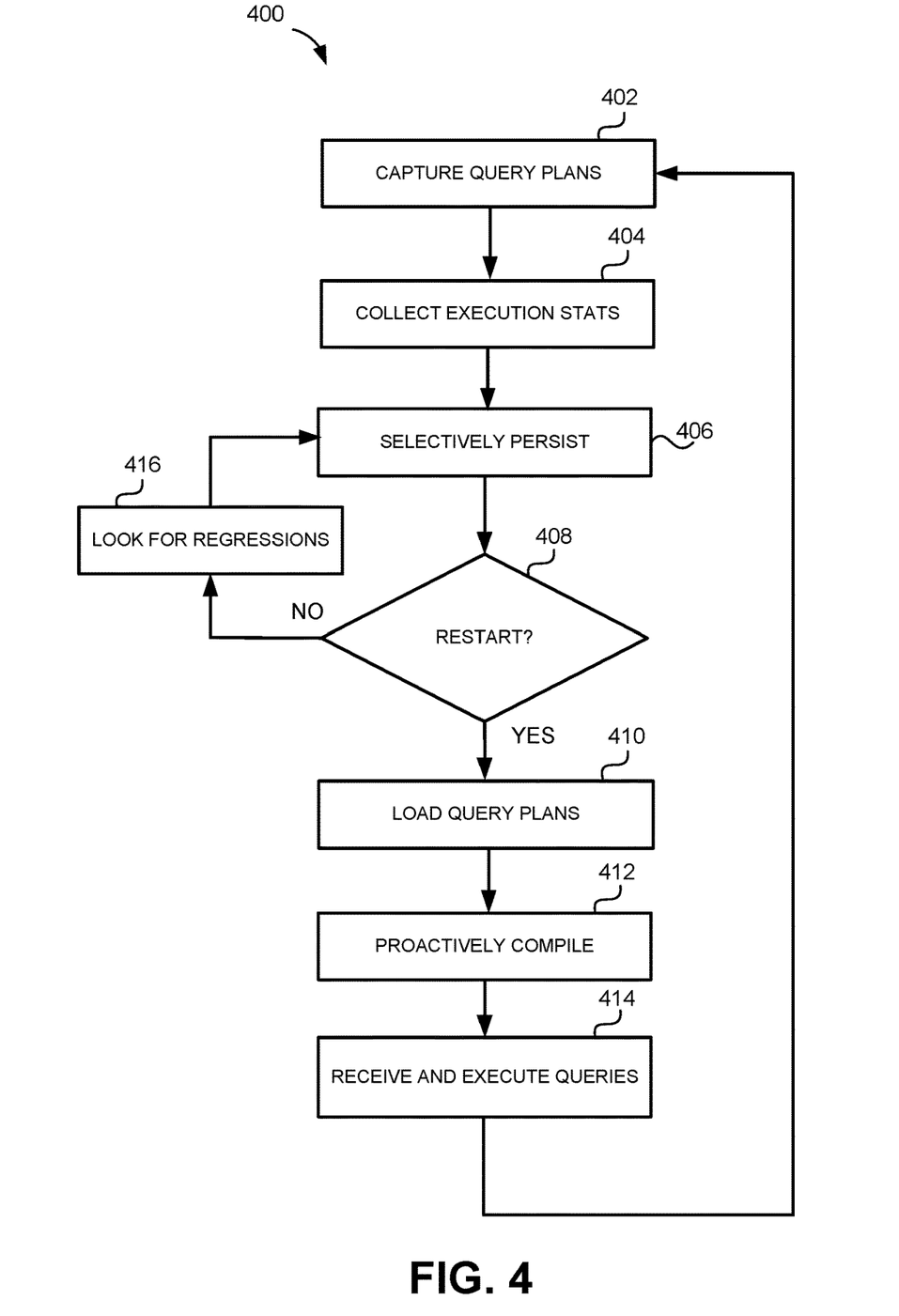
FIG. 4 is a flow diagram illustrating an example method for proactively compiling in-memory database management system (DBMS) query plans upon startup of the in-memory DBMS.

FIG. 4 is a flow diagram illustrating an example method for proactively compiling in-memory database management system (DBMS) query plans upon startup of the in-memory DBMS. During normal operation of the in-memory DBMS various operations may be performed to cache information regarding query execution plans that have been performed in the past by the in-memory DBMS. First, at step 402, a plurality of alternative query execution plans are captured. In some embodiments, this entails capturing all proposed query plans that are generated and tested. In some other embodiments, a cost-based ranking of possible query plans are ranked based on increasing cost and a threshold number of least cost query plans are captured.

Next, at step 404, associated execution statistics are captured for each of the plurality of alternative query execution plans. In some embodiments, such execution statistics are calculated in connection with a process of determining which query plan is best. In some other embodiments, additional execution statistics are calculated to facilitate making future determinations regarding which query plan to revert to in the case of a future query plan regression. Next, at step 406, the plurality of alternative query execution plans are selectively persisted with the associated execution statistics to one or more persistent data stores. Next, at test 408, it is determined whether the in-memory DBMS has restarted. In case of a restart, a volatile memory-based cache of query plans may be lost, so that new query plans may need to be regenerated.

If it is determined at test 408 that the in-memory DBMS has not been restarted, at step 416, in response to detecting one or more query execution performance regressions associated with a regressed query plan several steps may be performed. First, any such regressed query plan may be compared with one or more prior query plans to determine whether a candidate prior query plan performs better than the regressed query plan. If the candidate query plan would be more efficient, the regressed query plan may be replaced with the candidate prior query plan.

Alternatively, if it is determined at test 408 that the in-memory DBMS has in fact been restarted, at step 410, a selected portion of the plurality of alternative query execution plans is re-loaded with associated execution statistics. In some embodiments, this information may be accessed and loaded from the one or more persistent data stores directly or from another source of information, such as a memory region into which some or all of the contents from the one or more persistent data stores has been loaded into. Next, at step 412, the selected portion of the plurality of alternative query execution plans is proactively compiled so that when a query is received a compiled query plan will be ready to be used to execute the received query. Finally, at step 414, a plurality of received queries is received to be executed, and the plurality of received queries is executed based on the proactively compiled plurality of alternative query execution plans.

In some embodiments, the associated execution statistics for each of the plurality of alternative query execution plans include one or more captured time stamps, the one or more captured time stamps being correlated with a time of capture for each of the plurality of alternative query execution plans. In some such embodiments, the selected portion of the plurality of alternative query execution plans comprises a plurality of recent query execution plans bearing time stamps more recent than a threshold time. In some other embodiments, the proactively compiling the plurality of alternative query execution plans involves asynchronously compiling the plurality of alternative query execution plans in an order according to recency of having been persisted. In yet other embodiments, the associated execution statistics for each of the plurality of alternative query execution plans comprise a frequency of execution for each of the plurality of alternative query execution plans. In some such embodiments, the proactively compiling the plurality of alternative query execution plans involves asynchronously compiling the plurality of alternative query execution plans in an order according to the frequency of execution. The receiving a plurality of received queries to be executed may not be performed until completion of the proactively compiling the plurality of alternative query execution plans.

Figure 5:
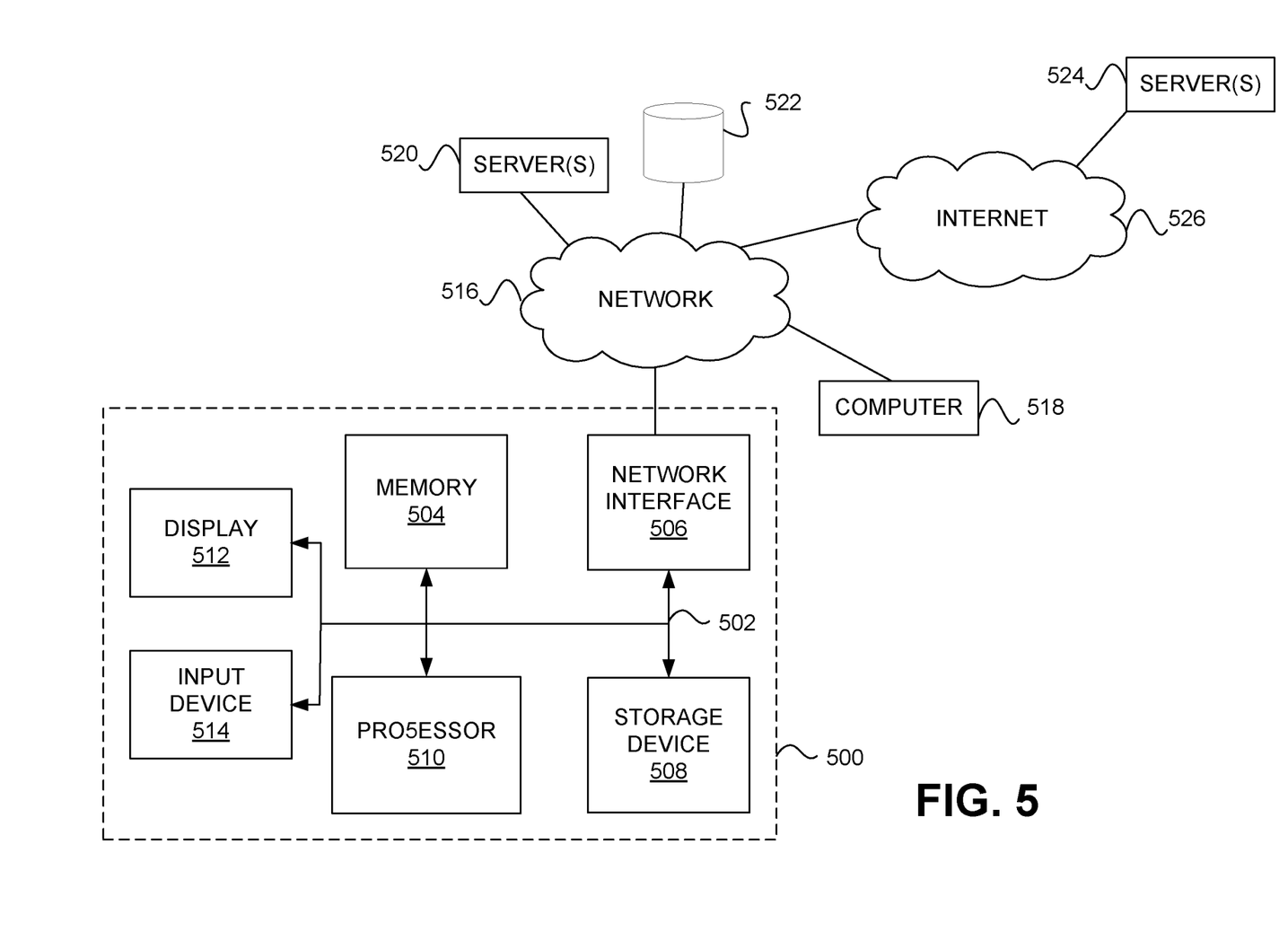
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for proactively compiling in-memory database management system (DBMS) query plans upon startup of the in-memory DBMS, the method comprising:
  during normal operation of the in-memory DBMS:
   capturing a plurality of alternative query execution plans;
   collecting associated execution statistics for each of the plurality of alternative query execution plans;
   selectively persisting the plurality of alternative query execution plans with the associated execution statistics to one or more persistent data stores;
   in response to detecting one or more query execution performance regressions associated with a regressed query plan:
    comparing the regressed query plan with one or more prior query plans; and
    in response to determining that a candidate prior query plan of the one or more prior query plans performs better than the regressed query plan, replacing the regressed query plan with the candidate prior query plan; and
  upon a restart of the in-memory DBMS:
   loading a selected portion of the plurality of alternative query execution plans with the associated execution statistics from the one or more persistent data stores;
   proactively compiling the selected portion of the plurality of alternative query execution plans;
   receiving a plurality of received queries to be executed; and
   executing the plurality of received queries based on the proactively compiled plurality of alternative query execution plans.

2. The non-transitory computer-readable media of claim 1, wherein the associated execution statistics for each of the plurality of alternative query execution plans comprise one or more captured time stamps, the one or more captured time stamps being correlated with a time of capture for each of the plurality of alternative query execution plans.

3. The non-transitory computer-readable media of claim 2, wherein the selected portion of the plurality of alternative query execution plans comprises a plurality of recent query execution plans bearing time stamps more recent than a threshold time.

4. The non-transitory computer-readable media of claim 1, wherein the proactively compiling the plurality of alternative query execution plans involves asynchronously compiling the plurality of alternative query execution plans in an order according to recency of having been persisted.

5. The non-transitory computer-readable media of claim 1, wherein the associated execution statistics for each of the plurality of alternative query execution plans comprise a frequency of execution for each of the plurality of alternative query execution plans.

6. The non-transitory computer-readable media of claim 5, wherein the proactively compiling the plurality of alternative query execution plans involves asynchronously compiling the plurality of alternative query execution plans in an order according to the frequency of execution.

7. The non-transitory computer-readable media of claim 1, wherein the receiving a plurality of received queries to be executed is not performed until completion of the proactively compiling the plurality of alternative query execution plans.

8. A method for proactively compiling in-memory database management system (DBMS) query plans upon startup of the in-memory DBMS, the method comprising:
  during normal operation of the in-memory DBMS:
   capturing a plurality of alternative query execution plans;
   collecting associated execution statistics for each of the plurality of alternative query execution plans;
   selectively persisting the plurality of alternative query execution plans with the associated execution statistics to one or more persistent data stores;
   in response to detecting one or more query execution performance regressions associated with a regressed query plan:
    comparing the regressed query plan with one or more prior query plans; and
    in response to determining that a candidate prior query plan of the one or more prior query plans performs better than the regressed query plan, replacing the regressed query plan with the candidate prior query plan; and
  upon a restart of the in-memory DBMS:
   loading a selected portion of the plurality of alternative query execution plans with the associated execution statistics from the one or more persistent data stores;
   proactively compiling the plurality of alternative query execution plans;
   receiving a plurality of received queries to be executed; and
   executing the plurality of received queries based on the proactively compiled plurality of alternative query execution plans.

9. The method of claim 8, wherein the associated execution statistics for each of the plurality of alternative query execution plans comprise one or more captured time stamps, the one or more captured time stamps being correlated with a time of capture for each of the plurality of alternative query execution plans.

10. The method of claim 9, wherein the selected portion of the plurality of alternative query execution plans comprises a plurality of recent query execution plans bearing time stamps more recent than a threshold time.

11. The method of claim 8, wherein the proactively compiling the plurality of alternative query execution plans involves asynchronously compiling the plurality of alternative query execution plans in an order according to recency of having been persisted.

12. The method of claim 11, wherein the associated execution statistics for each of the plurality of alternative query execution plans comprise a frequency of execution for each of the plurality of alternative query execution plans.

13. The method of claim 12, wherein the proactively compiling the plurality of alternative query execution plans involves asynchronously compiling the plurality of alternative query execution plans in an order according to the frequency of execution.

14. The method of claim 8, wherein the receiving a plurality of received queries to be executed is not performed until completion of the proactively compiling the plurality of alternative query execution plans.

15. A system for proactively compiling in-memory database management system (DBMS) query plans upon startup of the in-memory DBMS, the system comprising:
   at least one processor;
   and at least one non-transitory memory storing computer executable instructions that when executed by the at least one processor cause the system to carry out actions comprising:
      during normal operation of the in-memory DBMS:
         capturing a plurality of alternative query execution plans;
         collecting associated execution statistics for each of the plurality of alternative query execution plans;
         selectively persisting the plurality of alternative query execution plans with the associated execution statistics to one or more persistent data stores;
         in response to detecting one or more query execution performance regressions associated with a regressed query plan:
            comparing the regressed query plan with one or more prior query plans; and
            in response to determining that a candidate prior query plan of the one or more prior query plans performs better than the regressed query plan, replacing the regressed query plan with the candidate prior query plan; and
      upon a restart of the in-memory DBMS:
         loading a selected portion of the plurality of alternative query execution plans with the associated execution statistics from the one or more persistent data stores;
         proactively compiling the plurality of alternative query execution plans;
         receiving a plurality of received queries to be executed; and
         executing the plurality of received queries based on the proactively compiled plurality of alternative query execution plans.

16. The system of claim 15, wherein the associated execution statistics for each of the plurality of alternative query execution plans comprise one or more captured time stamps, the one or more captured time stamps being correlated with a time of capture for each of the plurality of alternative query execution plans.

17. The system of claim 15, wherein the selected portion of the plurality of alternative query execution plans comprises a plurality of recent query execution plans bearing time stamps more recent than a threshold time.

18. The system of claim 15, wherein the proactively compiling the plurality of alternative query execution plans involves asynchronously compiling the plurality of alternative query execution plans in an order according to recency of having been persisted.

19. The system of claim 18, wherein the associated execution statistics for each of the plurality of alternative query execution plans comprise a frequency of execution for each of the plurality of alternative query execution plans.

20. The system of claim 19, wherein the proactively compiling the plurality of alternative query execution plans involves asynchronously compiling the plurality of alternative query execution plans in an order according to the frequency of execution.

* * * * *